US011647386B2

(12) United States Patent
Cyril et al.

(10) Patent No.: US 11,647,386 B2
(45) Date of Patent: May 9, 2023

(54) DEVICE BASED CREDENTIALS

(71) Applicant: Comcast Cable Communications, LLC, Philadelphia, PA (US)

(72) Inventors: Theodore Cyril, Philadelphia, PA (US); Brad Mayer, Philadelphia, PA (US); Saravanan Muthusamy, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/786,397

(22) Filed: Oct. 17, 2017

(65) Prior Publication Data

US 2019/0116493 A1 Apr. 18, 2019

(51) Int. Cl.
| | |
|---|---|
| *H04W 12/06* | (2021.01) |
| *H04W 8/02* | (2009.01) |
| *H04L 9/40* | (2022.01) |
| *H04W 12/04* | (2021.01) |
| *H04W 8/20* | (2009.01) |
| *H04W 12/69* | (2021.01) |

(52) U.S. Cl.
CPC ............ *H04W 12/06* (2013.01); *H04L 63/06* (2013.01); *H04L 63/0876* (2013.01); *H04L 63/102* (2013.01); *H04W 8/02* (2013.01); *H04W 8/205* (2013.01); *H04W 12/04* (2013.01); *H04W 12/69* (2021.01)

(58) Field of Classification Search
CPC ..... H04W 12/06; H04W 8/205; H04W 12/04; H04L 63/0876; H04L 63/083
See application file for complete search history.

(56) References Cited

U.S. PATENT DOCUMENTS

| | | | |
|---|---|---|---|
| 7,171,460 B2 | 1/2007 | Kalavade et al. | |
| 7,738,488 B2 | 6/2010 | Marsico et al. | |
| 7,864,673 B2 | 1/2011 | Bonner | |
| 8,594,628 B1 | 11/2013 | Schroeder et al. | |
| 2005/0177515 A1 | 8/2005 | Kalavade et al. | |
| 2008/0216153 A1* | 9/2008 | Aaltonen | H04L 63/083 726/3 |
| 2009/0125945 A1* | 5/2009 | Lee | H04N 21/4331 725/105 |
| 2012/0149334 A1 | 6/2012 | Zhang et al. | |
| 2015/0128254 A1* | 5/2015 | Rao | G06F 21/31 726/18 |

(Continued)

*Primary Examiner* — Said M Elnoubi
(74) *Attorney, Agent, or Firm* — Ballard Spahr LLP

(57) ABSTRACT

Methods and systems for providing a wireless communication service are disclosed. A device identifier for a wireless communication service can be used to generate a connection profile (e.g., communication profile, wide-area network profile, service profile, network profile, etc.) for the wireless communication service that requires credentials for authentication. The connection profile can be generated in response to a user accessing or signing up for the wireless communication service. The connection profile can comprise a username that includes and/or mirrors the device identifier and a password generated by inputting the device identifier into a predefined function. The connection profile also can comprise an authentication identifier. A service provider applies a specific type of authentication for devices that provide the authentication identifier as part of an authentication request message.

29 Claims, 9 Drawing Sheets

(56) References Cited

U.S. PATENT DOCUMENTS

2015/0282042 A1* 10/2015 Griot ................ H04W 48/18
　　　　　　　　　　　　　　　　　　　　370/329
2016/0034265 A1* 2/2016 Nguyen ................ G06F 8/61
　　　　　　　　　　　　　　　　　　　　717/178

* cited by examiner

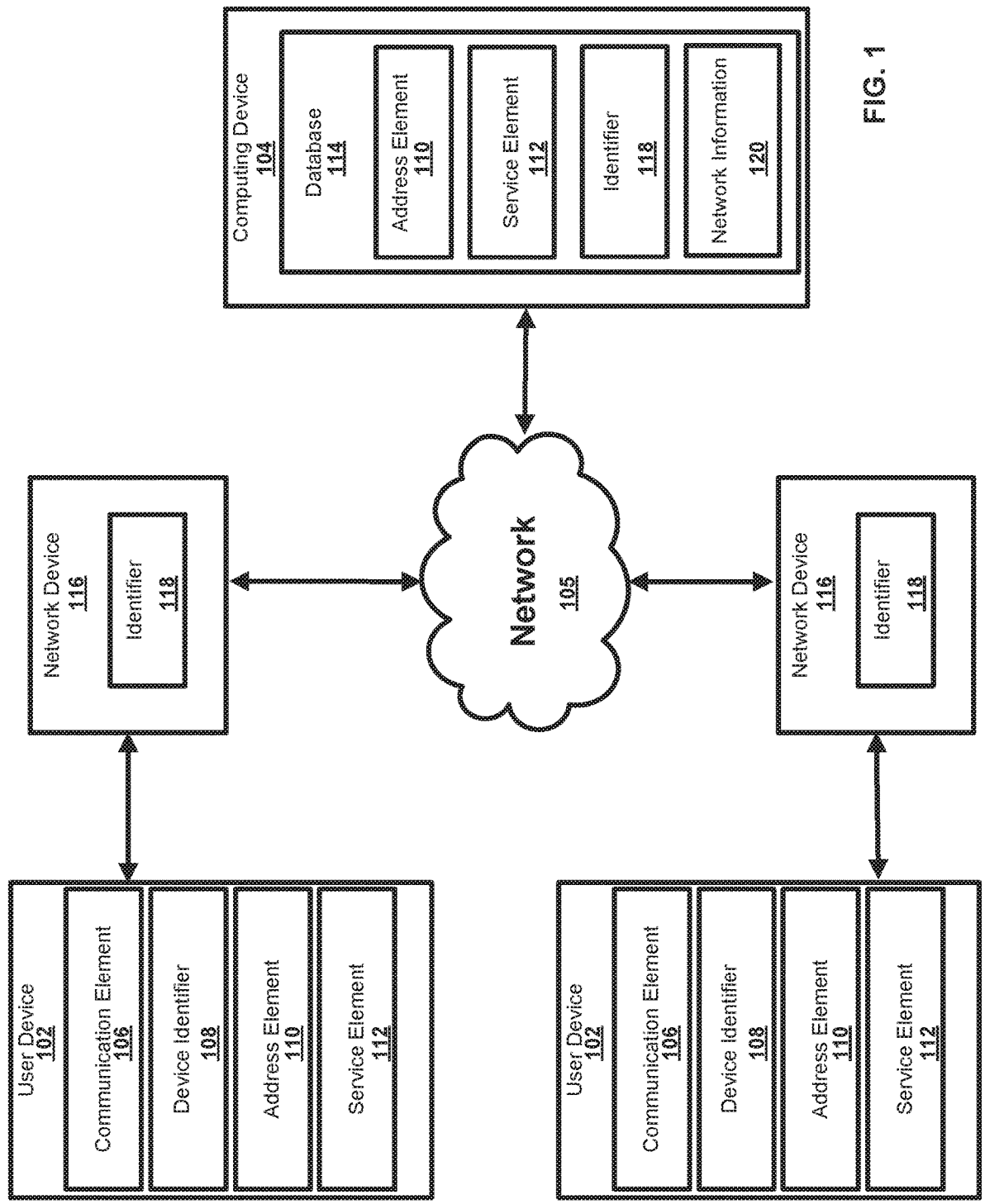

FIG. 3

```
{
  "name": "Company XXX Provisioning Profile",  ◄──── 301
  "company": "XXX",
  "serial": "1234889500",  ◄──── 302
  "create_date": "20170527.131401",  ◄──── 303
  "issue_date": "20170527.141623",  ◄──── 304
  "profiles": [
  {
    "connection": {
      "type": "secure",  ◄──── 305
      "ssid": "ABC123-Secure",  ◄──── 306
      "ssid_tag": "Secure hotspot by Company XXX",  ◄──── 307
      "bssid": "ANY",  ◄──── 308
      "hotspot_type": "public",  ◄──── 309
      "auto-join": "true",  ◄──── 310
      "encryption_type": "WPA2-Enterprise",  ◄──── 311
      "outer_auth_method": "EAP-TTLS",  ◄──── 312
      "inner_auth_method": "PAP",  ◄──── 313
      "trusted_server": [  ◄──── 314
          "secure.server.1.company.com",
          "secure.server.2.company.com"]
    },
    "credentials": {  ◄──── 315
      "outer-id": "/acme",
      "username": "748892030948794892837 4",
      "password": "<function value>",
      "security": "ABC123"
    }
  },
```

FIG. 4

Outer Authentication Request: ◄─── 401
   User-Name = "/acme" ◄─── 402
   NAS-IP-Address = 1.2.3.4 ◄─── 403
   NAS-Identifier = "aa:bb:cc:11:22:33" ◄─── 404
   NAS-Port = 0
   Called-Station-Id = "BC-AB-CC-11-11-22:ABC123-Secure" ◄─── 405
   Calling-Station-Id = "AA-BB-CC-11-22-33" ◄─── 406
   Framed-MTU = 1400
   NAS-Port-Type = Wireless-IEEE-802-11
   Connect-Info = "CONNECT 0Mbps 802.11b"
   EAP-Message = <hidden>
   Message-Authenticator = "6F00D875B3F0BA3C3687AC8E8DD00E4F"

Inner Authentication Request: ◄─── 407
   NAS-IP-Address = 1.2.3.4 ◄─── 408
   NAS-Identifier = "aa:bb:cc:11:22:33" ◄─── 409
   NAS-Port = 0
   Called-Station-Id = "BC-AB-CC-11-11-22:ABC123-Secure" ◄─── 410
   Calling-Station-Id = "AA-BB-CC-11-22-33"
   Framed-MTU = 1400
   NAS-Port-Type = Wireless-IEEE-802-11
   Connect-Info = "CONNECT 0Mbps 802.11b"
   User-Name(~M) = "7488920309487948928374" ◄─── 411
   User-Password(~M) = <function value> ◄─── 412

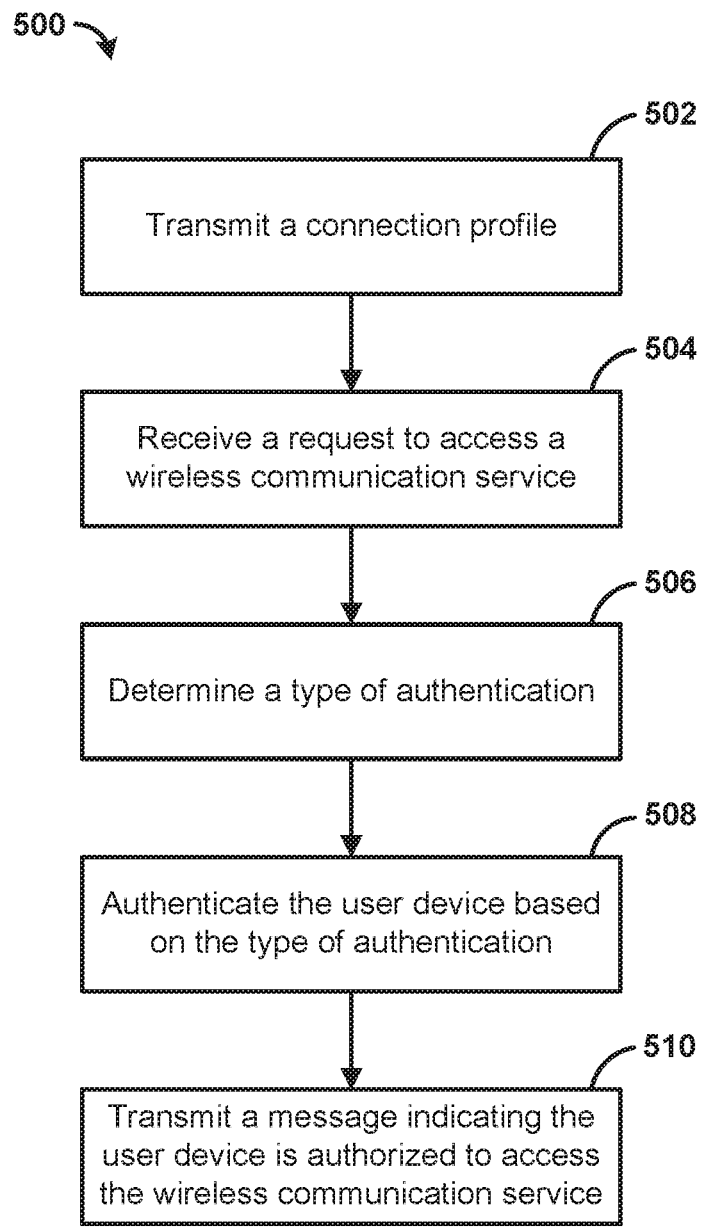

DEVICE BASED CREDENTIALS

BACKGROUND

Wireless network providers employ user-based credentials to authenticate devices for access to a network. In some applications, managing user-based credentials can be inefficient and requires large amounts of data storage. These and other shortcomings are overcome by the approaches set forth herein.

SUMMARY

It is to be understood that both the following general description and the following detailed description are example and explanatory only and are not restrictive. Methods and systems for using device-based credentials for wireless communication service are described. In one aspect, when a user registers a user device for a wireless service (e.g., a mobile voice communication service, a mobile telephony service, Wi-Fi data service, cellular data service, etc.), a device identifier can be used to generate credentials to enable the user device to access the wireless service via one or more of a plurality of access points. The device identifier can comprise a user identifier associated with a wireless communication service, such as an international mobile subscriber identity (IMSI). The device identifier can be used, for example, without an additional password, to authenticate a user on the wireless communication service, such as whenever the user device is initially turned on, boots-up, and/or activated.

In another aspect, a connection profile can be generated that comprises a username that is set to the device identifier, and a password generated by inputting the device identifier into a predefined function, such as a one way hash function. The connection profile can be transmitted to the user device. The connection profile can comprise network identifier information (e.g., service set identifier (SSID) information, network access point identification information, etc.) that can be used by the user device to establish a communication session with an authentication device (e.g., server). As such, the connection profile can also comprise an authentication identifier. A service provider is later able to apply a specific type of authentication for devices that provide the authentication identifier as part (e.g., in an outer identifier of an extensible authentication protocol message) of an authentication process.

In another aspect, the authentication device can compare information received from the user device during the communication session to information stored in a profile. The authentication device can enable the user device to access a wireless communication service based on the comparison of the information received from the user device and the information stored in the profile.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, are examples, and together with the description, serve to explain the principles of the methods and systems:

FIG. 1 is a block diagram of an example system;

FIG. 3 is an example connection profile;

FIG. 4 is an example authentication request message;

FIG. 5 is a flowchart of an example method;

DETAILED DESCRIPTION

Figure 2A:
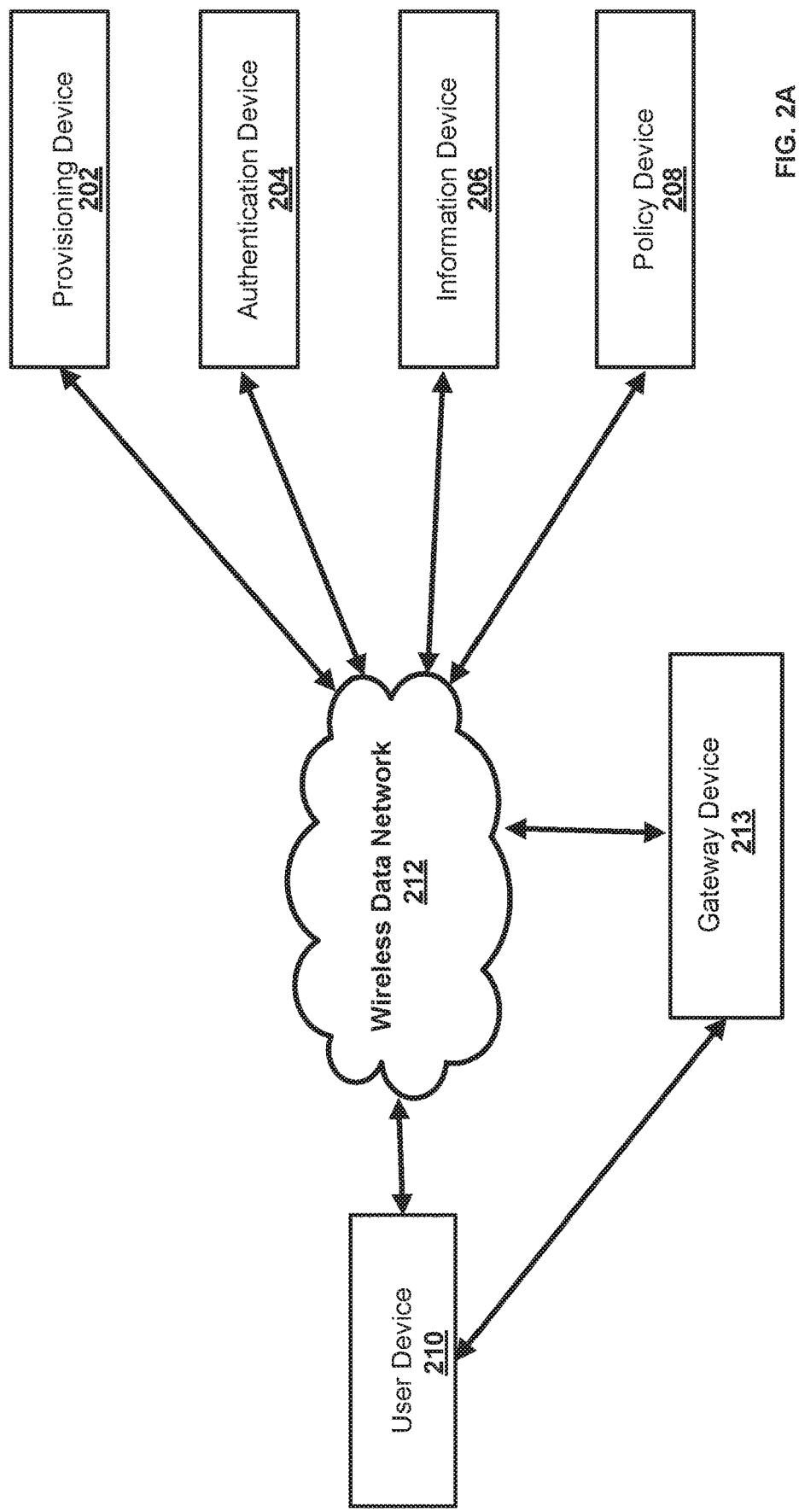
FIG. 2A is a block diagram of an example system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowcharts of methods, systems, apparatuses and computer program products. It will be understood that each block of the block diagrams and flowcharts, and combinations of blocks in the block diagrams and flowcharts, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowcharts support combinations of means for performing the specified functions, combinations of steps for performing the specified functions and program instruction means for performing the specified functions. It will also be understood that each block of the block diagrams and flowcharts, and combinations of blocks in the block diagrams and flowcharts, can be implemented by special purpose hardware-based computer systems that perform the specified functions or steps, or combinations of special purpose hardware and computer instructions.

Note that in various instances this detailed disclosure may refer to a given entity performing some action. It should be understood that this language may in some cases mean that a system (e.g., a computer) owned and/or controlled by the given entity is actually performing the action.

The present disclosure relates to methods and systems for using device-based credentials for wireless communication service (e.g., a mobile voice communication service, a mobile telephony service, Wi-Fi data service, cellular data service, etc.) authentication. As part of signing up for a wireless communication service a user can purchase a user device. When the user device is purchased, or at any other time, information associated with the user device can be accessed and/or generated and added to a data store for devices participating in the wireless communication service. The information associated with the user device can be stored in a database, such as a database accessible to a provisioning server, policy server, and similar devices, to enable the user device to access one or more networks (e.g., Wi-Fi data network, cellular data network, wide-area network, etc.) associated with the wireless communication service. User credentials for accessing the wireless communication service can be generated using at least a part of credentials associated with a device (e.g., device-based). For example, a username can be generated that comprises a device identifier, such as an international mobile subscriber identity (IMSI), associated with the user device. Additionally, a password can be generated by applying a predefined function, such as a hash function, to at least a portion of the device identifier, for example. A profile (e.g., user profile, service account, etc.) can be associated with the user device when the user purchases the user device. The account can comprise information associated with the user device such as the username, the password, a device identifier (e.g., international mobile equipment identity (IMEI)), and the IMSI, for example. The information associated with the user device (e.g., username, device identifier, password) can be used by a provisioning server (e.g., a network device, a provisioning device, a cloud-based device, etc.) to set-up (e.g., provision, enable, etc.) access to the wireless communication service supported via one or more of a plurality of access points (e.g., wireless access points, gateway devices, etc.) associated with the wireless communication service.

To set-up/enable the user device to access the wireless communication service (e.g., a mobile voice communication service, a mobile telephony service, Wi-Fi data service, cellular data service, etc.), the provisioning server can query a storage for network information (e.g., network identifiers, encryption keys, encryption settings, service information, service provider information, etc.) based on the profile (e.g., user profile, service account, etc.) associated with the user. The storage can be associated with one or more of a plurality of access points (e.g., wireless access points, gateway devices, etc.) associated with the wireless communication service. The network information can be sent to other devices associated with and/or in communication with the provisioning server, such as a policy server, an authentication device, and the like. The provisioning server can provide the network information along with the information associated with the user device (e.g., the username, the password, the device identifier (e.g., IMEI), and/or the IMSI) to the policy server in response to a request, by the user device, to access the wireless communication service. The request to access the wireless communication service can comprise a request for a connection profile associated with the wireless communication service. The policy server can reconcile the information associated with the user device with information received from the user device when the user device boots up (e.g., power on) or is initialized for the wireless communication service (e.g., after the user device is purchased).

When the user device boots up (e.g., turns on, initializes, etc.) to gain access to the wireless communication service (e.g., a mobile voice communication service, a mobile telephony service, Wi-Fi data service, cellular data service, etc.), the user device can communicate (e.g., limited communication, provisioning communication, etc.) with an access point of the plurality of access points associated with the wireless communication service. A Wi-Fi Connection Manager (WFM) configured on and/or associated with the user device can send the device identifier (e.g., IMEI) of the user device and/or the device identifier (e.g., IMSI) to the policy server and request a connection profile (e.g., communication profile, wide-area network profile, service profile, network profile, etc.). The connection profile can comprise information, such as information that defines how a connection to and/or communication with the wireless communication service is established and/or maintained, identification information, security information, encryption information, and authentication information, for example. As a security component of the wireless communication service, the policy server can reconcile the information associated with the user device with the information received from the WFM by the comparing the information obtained from the provisioning server with that received from the user device (e.g., WFM). If the information matches, the connection profile can be transmitted to the user device.

After receiving the connection profile, the user device can use the connection profile to establish a communication session (e.g., limited communication session, provisioning communication session, etc.) with an authentication device. During the communication session, the user device can send an authentication request to the authentication device. The authentication device can recognize that the user device is associated with the wireless communication service. The authentication device can determine a type of authentication (e.g., by determining an authentication identifier) for authenticating the user device. The type of authentication can be associated with the wireless communication service. The authentication device can perform a predefined function (e.g., a hash function) on the device identifier and compare a result of performing the predefined function on the device identifier to the password. If the result and the device identifier match, the user device can be allowed to access the wireless communication service. If the result and the device identifier do not match, the user device can be denied access.

A system can be configured to provide services, such as network-related services, to a user device. FIG. 1 features an example environment in which the present methods and systems can operate. The present disclosure is relevant to systems and methods for providing services to a device, for example, a user device such as a computer, tablet, mobile device (e.g., smartphone), communications terminal, or the like. One or more network devices can be configured to provide various services to one or more devices. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a user device 102 in communication with another a user device 102 and/or a computing device 104 such as a server, for example. The computing device 104 can be disposed locally or remotely relative to the user device 102. As an example, one or more user devices 102 and the computing device 104 can be in communication via a network 105. The network 105 can comprise a private network (e.g., local area network) and/or a public network (e.g., the Internet). Other forms of communications can be used such as wired and wireless telecommunication channels, for example.

The user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting and/or receiving information to/from the user, such as user feedback. An example interface may be communication interface such as a web browser (e.g., Internet Explorer®, Mozilla Firefox®, Google Chrome®, Safari®, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

The user device 102 can be associated with an identifier, such as device identifier 108. As an example, the device identifier 108 can be any identifier, token, character, string, or the like, for differentiating one user device (e.g., user device 102) from another user device. The device identifier 108 can identify a user device as belonging to a particular class of user devices. As a further example, the device identifier 108 can comprise information relating to the user device, such as a serial number, a manufacturer, a model or type of device, a service provider associated with the user device 102, a state of the user device 102, a locator, and/or a label or classifier. Other information can be represented by the device identifier 108.

The device identifier 108 can be, can comprise, and or be associated with user credentials. For example, the user credentials can be information associated with the user device 102 such as, a username and/or password generated/determined based on device-based information such as an international mobile subscriber identity (IMSI). Additionally, the user credentials can be information associated with the user device 102 such as, a username and/or password generated/determined based on device-based information such as an international mobile equipment identity (IMEI) a media access control (MAC) address, similar information, combinations thereof, and the like. The device identifier 108 can comprise an address element 110. The address element 110 can comprise or provide an internet protocol address, a network address, a media access control (MAC) address, an Internet address, and/or the like. As an example, the address element 110 can be relied upon to establish a communication session between the user device 102 and the computing device 104 or other devices and/or networks, such as a provisioning device (e.g., provisioning device 202), an authentication device (e.g., authentication device 204), and a policy device (e.g., policy device 208), for example. As a further example, the address element 110 can be used as an identifier or locator of the user device 102. The address element 110 can be persistent for a particular network.

The device identifier 108 can comprise a service element 112. The service element 112 can identify a device within a network such as a WI-FI network, cellular network, wide-area network, and the like. For example, the service element 112 can be an international mobile subscriber identity (IMSI). The service element 112 can comprise an identification of a service provider associated with the user device 102 and/or with the class of user device 102. The class of the user device 102 can be related to a type of device, capability of device, type of service being provided, and/or a level of service (e.g., business class, service tier, service package, etc.). For example, the service element 112 can comprise information relating to or provided by a communication service provider (e.g., wireless communication service provider, Internet service provider, cellular service provider, mobile telephony service provider, data service provider, etc.) that is providing or enabling data flow such as communication services to the user device 102. As a further example, the service element 112 can comprise information relating to a preferred service provider for one or more particular services relating to the user device 102.

The address element 110 can be used to identify or retrieve data from the service element 112, or vice versa. As a further example, one or more of the address element 110 and the service element 112 can be stored remotely from the user device 102 and retrieved by one or more devices such as the user device 102 and the computing device 104. Other information can be represented by the service element 112.

The computing device 104 can be a server (e.g., a provisioning server, a policy server, an authentication server, provisioning device 202, authentication device 204, information device 206, policy device 208) for communicating with the user device 102. As an example, the computing device 104 can communicate with the user device 102 for providing data and/or services. As an example, the computing device 104 can provide services such as network (e.g., Internet) connectivity, device registration services, device provisioning services, device authentication services, device policy services, media management (e.g., media server), content services, streaming services, broadband services, or other network-related services. The computing device 104 can allow the user device 102 to interact with remote resources such as data, devices, and files.

One or more network devices 116 can be in communication with a network such as a network 105. As an example, one or more of the network devices 116 can facilitate the connection of a device, such as the user device 102, to the network 105 to facilitate communication between the user device 102 and the computing device 104. As a further example, one or more of the network devices 116 can be configured as a wireless access point (WAP). One or more network devices 116 can be configured to allow one or more wireless devices to connect to a wired and/or wireless network using Wi-Fi, Bluetooth or any desired method or standard.

The network devices 116 can be configured as a local area network (LAN). As an example, one or more network devices 116 can comprise a dual band wireless access point. As an example, the network devices 116 can be configured with a first service set identifier (SSID) (e.g., associated with a user network or private network) to function as a local network for a particular user or users. As a further example, the network devices 116 can be configured with a second service set identifier (SSID) (e.g., associated with a public/community network or a hidden network, network managed by a service provider, wide area network, network accessible via user credentials with the service provider) to function as a secondary network or redundant network for connected communication devices. Additionally, the network devices 116 can be configured as cell sites (e.g., cell towers) to enable access to a cellular network, cellular/Wi-Fi mesh network, and the like.

One or more network devices 116 can comprise an identifier 118. As an example, one or more identifiers can be or relate to an Internet Protocol (IP) Address IPV4/IPV6 or a media access control address (MAC address) or the like. As a further example, one or more identifiers 118 can be a unique identifier for facilitating communications on the physical network segment. Each of the network devices 116 can comprise a distinct (e.g., different, unique) identifier 118. As an example, the one or more identifiers 118 can be associated with a physical location of the network devices 116.

The computing device 104 can manage communication between the user device 102 and a database 114 for sending and receiving data therebetween via the network 105. As an example, the database 114 can store a plurality of files (e.g., web pages), device and/or service provisioning information, profiles (e.g., user profiles, service accounts, etc.), connection profiles (e.g., communication profiles, wide-area network profiles, service profiles, network profiles, etc.), device identifiers or records, or other information. As a further example, the user device 102, based on a device identifier and/or similar information, can request and/or retrieve a file (e.g., a connection profile, etc.) from the database 114. The user device 102 can request and/or retrieve a file (e.g., a connection profile) from the database 114 that enables the user device 102 to access the network 105 and/or a service (e.g., wireless communication service) supported by the network 105. The database 114 can store information relating to the user device 102 such as a profile (e.g., user profile, service account, etc.), the device identifier 108 (e.g., IMEI, IMSI, etc.), the address element 110 and/or the service element 112. The computing device 104 can obtain the device identifier 108 from the user device 102 and reconcile/compare it with information from the database 114 such as the address element 110 and/or the service elements 112. As an example, the user device 102 can send device-based credentials such as the device identifier 108 (e.g., IMEI, IMSI, etc.) to the computing device 104 and request a file (e.g., connection profile) from the computing device 104. The file (e.g., connection profile) can comprise information, such as information that defines how a connection to and/or communication with the network 105 is established and/or maintained, identification information (e.g., device identifier 108, identifier 118), security information, encryption information, and authentication information, for example. The computing device 104 can reconcile information associated with the user device (e.g., device identifier 108) stored in the database 114 with information (e.g., device identifier 108) received from the user device 102. As a further example, the computing device 104 can obtain the address element 110 from the user device 102 and can retrieve the service element 112 from the database 114, or vice versa. Any information can be stored in and retrieved from the database 114. The database 114 can be disposed remotely from the computing device 104 and accessed via direct or indirect connection. The database 114 can be integrated with the computing device 104 or some other device or system.

The database 114 can be configured to store network information 120. The network information 120 can comprise first connection information for a first service, such as a first wireless communication service (e.g., mobile voice communication service, mobile telephony service, Wi-Fi data service, cellular data service, etc.). The first wireless communication service can comprise a public wireless hotspot, a wireless network managed by a service provider (e.g., wide area wireless network), a wireless communication network accessible using user credentials, combinations thereof, and the like. For example, a plurality of access points can be located across a geographic area (e.g., building, region, state, country). One or more (or each) of the plurality of access points can be configured to provide access to the first wireless communication service (e.g., based on the first service identifier). One or more (or each) of the plurality access points can be configured to transmit (e.g., broadcast) and/or receive the first service identifier (e.g., as part of providing access to the first wireless communication service, as part of advertising the first wireless communication service, as part of authenticating for the first wireless communication service). The first connection information can comprise additional information associated with (e.g., stored with, associated via a data structure such as a database) the first service identifier. The additional information can comprise encryption keys, encryption type, certificates, service provide information, service information, combinations thereof, and the like. The additional information can comprise first user credentials. The first user credentials can comprise a username (e.g., username for an account with the service provider) and/or password (e.g., password for the account) for accessing the first wireless communication service.

The network information can comprise second connection information for a second wireless communication service (e.g., mobile voice communication service, mobile telephony service, Wi-Fi data service, cellular data service, etc.). Alternatively, the second wireless communication service can be associated with a private wireless network, a user deployed wireless network, a home (e.g., or other premises) wireless network, and the like. The second wireless communication service can be managed by a service provider and comprise one or more access points, wireless gateways, cellular towers, cellular access points, combinations thereof, and the like. Alternatively, the second wireless communication service can be managed by a user associated with the user device (e.g., at a home or premises associated with the user). Despite the nature of the second wireless communication service (e.g., mobile voice communication service, mobile telephony service, Wi-Fi data service, cellular data service, etc.), the second connection information can comprise a second service set identifier (SSID) (e.g., wireless service set identifier) of the second wireless communication service. The second connection information can comprise second user credentials. The second user credentials can comprise a username associated with the second wireless communication service. The second user credentials can comprise a password associated with the second wireless communication service. For example, the user can provide the second service identifier, username, and/or the password to an access point (e.g., network device 116) and/or cellular tower associated with the second wireless communication service. The access point and/or cellular tower can transmit the username and/or the password to the computing device 104. As another example, the user can provide (e.g., via an application, via web page) the second service identifier, the username, and/or the password to the computing device 104.

FIG. 2A is an example environment in which the present methods and systems can operate and features a plurality of devices, such as a provisioning device 202, an authentication device 204, an information device 206, a policy device 208, a user device 210, and a gateway device 213 associated with a wireless communication network 212. One or more of the plurality of devices, such as the provisioning device 202, the authentication device 204, the information device 206, and the policy device 208 can be a part of/associated with a single device (e.g., computing device 104, network device 116, etc.).

The user device 210 can be the user device 102 and the like. The user device 210 can be in communication with the wireless communication network 212, for example, to utilize a wireless communication service (e.g., to communicate with other user devices). The user device 210 can communicate with one or more devices connected to the wireless communication network 212, such as the policy device 208, to request the wireless communication service. To facilitate provisioning the wireless communication service for the user device 210, device-based information (e.g., an international mobile equipment identifier (IMEI), an international mobile service identifier (IMSI), user profile/account information) associated with the user device 210 can be stored by one or more devices, such as the provisioning device 202. For example, the device-based information associated with the user device 210 can be stored by the provisioning device 202 based on a purchase of the user device 210 and/or a purchase of a wireless communication service associated with the user device 210. When the user device 210 boots-up/initializes (e.g., power on) and requests access to a wireless communication service (e.g., mobile voice communication service, mobile telephony service, Wi-Fi data service, cellular data service, etc.), the user device 210 can request access to the wireless communication service via a limited access communication channel supported by a network, such as a wide area network (WAN), and/or the Internet, for example. The user device 210 can request access to the wireless communication service via an access point associated with the wireless communication network 212. A Wi-Fi Connection Manager (WFM) configured on and/or associated with the user device 210 can send device identifier information (e.g., IMEI, IMSI, etc.) associated with the user device 210 to the policy device 208 and request a connection profile. The connection profile can comprise information, such as information that defines how a connection to and/or communication with the wireless communication service is established and/or maintained, identification information, security information, encryption information, and authentication information, for example.

The provisioning device 202 can be a computing device, such as computing device 104, for example. The provisioning device 202 can facilitate provisioning the wireless communication service for the user device 210. The wireless communication network 212 can comprise and/or support the wireless communication service. The provisioning device 202 can facilitate provisioning the wireless communication service for the user device 210 by storing user credentials (e.g., a username, a password, etc.) associated with the user device 210. The user credentials can be network/system determined user credentials. The network/system determined user credentials can comprise a generated username and/or a generated password. The user credentials can be generated based on device identifier information. The device identifier information can comprise an international mobile service identifier (IMSI) and an international mobile equipment identifier (IMEI). The provisioning device 202 can receive and/or obtain the user credentials from the authentication device 204. The user credentials can be used by one or more devices (e.g., policy device 208, authentication device 204) to authorize the user device 210 for the wireless communication service. The provisioning device 202 can obtain one or more of a profile (e.g., user profile, service account, etc.), the device identifier information, and the like associated with the user device 210 from a database associated with a purchase of the user device 210. Additionally, the provisioning device 202 can obtain one or more of the profile (e.g., user profile, service account, etc.), the device identifier information, and the like associated with the user device 210 from a device in communication with the provisioning device 202, such as the authentication device 204, for example. The authentication device 204 can generate and/or determine the user credentials based on the device identifier information. The authentication device 204 can generate the user credentials by performing a hash function on at least a portion of the device identifier information. For example, the authentication device 204 can generate the user credentials by performing a hash function on the IMSI. Additionally, the user credentials can be user determined/manual user credentials.

The user determined/manual user credentials can comprise manually provisioned credentials such as a username and/or a manually provided password. For example, the provisioning device 202 can receive the user determined/manual user credential based on a manual input and/or provisioning, such as manual input and/or provisioning performed when the user device 210 is purchased and/or registered for the wireless communication service.

As described, the provisioning device 202 can be in communication with and/or associated with the authentication device 204. The authentication device 204 can be a computing device, such as the computing device 104, for example. The provisioning device 202 can provide the user credentials to the authentication device 204. The authentication device 204 can generate a username associated with the user device 210 that comprises a device identifier, such as an international mobile subscriber identity (IMSI), associated with the user device 210. Additionally, to secure access to the wireless communication service, the authentication device 204 can generate a password by applying a predefined function, such as a hash function, to at least a portion of the device identifier information (e.g., the IMSI). The user credentials (e.g., username and password) can be stored in a database (e.g., database 114) as information associated with the user device 210.

The provisioning device 202 can be in communication with and/or associated with the information device 206. The information device 206 can be a computing device, such as the computing device 104, for example. The information device 206 can store both generated and provided credentials, such as user credentials provided by the provisioning device 202. The user credentials can be stored in a database (e.g., the database 114). Additionally, the information device 206 can store network information associated with a network (e.g., the data network 212, the network 105). The network information can comprise information associated with an access point (e.g., the gateway device 213, the network device 118), one or more devices (e.g., the user device 210, the user device 102, the computing device 104, etc.), one or more service providers, one or more services (e.g., wireless communication service), combinations thereof, and the like, associated with a network (e.g., the wireless communication network 212, the network 105). The network information can be accessed by the provisioning device 204. The provisioning device 202 can access/obtain the network information by requesting it from the information device 206. Additionally, the provisioning device 202 can obtain the network information by querying a database associated the provisioning device 202 and/or querying a database associated the with the information device 206.

The provisioning device 202 can associate the network information with information associated with the user device 210 (e.g., a username, a password, device identifier information (e.g., IMEI, IMSI)) into an actionable package (e.g., provision information, an executable file, an executable program, a code, etc.). The actionable package can be sent to the policy device 208 to facilitate provisioning the wireless communication service (e.g., mobile voice communication service, mobile telephony service, Wi-Fi data service, cellular data service, etc.) for the user device 210. The policy device 208 can facilitate authorizing the user device 210 to use the wireless communication network 212. For example, the policy device 208 can use the actionable package to determine if the user device 210 is authorized to access the wireless communication service when the user device 210 boots-up/initializes or at any other time. For example, the provisioning device 202 can transmit the actionable package (e.g., provision information) to the policy device 208. The policy device 208 can use the actionable package to determine if the user device 210 is authorized to access the wireless communication service in response to the user device 210 requesting (e.g., registering for) the wireless communication service.

The provisioning device 202 can be in communication with and/or associated with the policy device 208. The policy device 208 can be a computing device, such as the computing device 104, for example. The policy device 208 can transmit data, such as a connection profile (e.g., communication profile, wide-area network profile, service profile, network profile, etc.), associated with the wireless communication network 212 to the user device 210. The connection profile can comprise information, such as information that defines how a connection to and/or communication with the wireless communication service is established and/or maintained, identification information, security information, encryption information, and authentication information, for example. The policy device 208 can transmit the connection profile to the user device 210 when the user device 210 boots-up/initializes or at any other time. For example, the provisioning device 202 can transmit the connection profile when the user device 210 boots-up/initializes and requests access to a wireless communication service (e.g., mobile voice communication service, mobile telephony service, Wi-Fi data service, cellular data service, etc.) supported by the wireless communication network 212. The request to access the wireless communication service can comprise a request for a connection profile associated with the wireless communication network 212. The policy device 208 can use the actionable package to determine if the user device 210 is authorized to receive the connection profile and/or access the wireless communication service in response to the user device 210 requesting (e.g., registering for) the wireless communication service.

The policy device 208 can reconcile information associated with the actionable packet with information received from the WFM configured on the user device 210 when the user device boots-up/initializes and requests access to the wireless communication service (e.g., mobile voice communication service, mobile telephony service, Wi-Fi data service, cellular data service, etc.). The policy device 208 can reconcile the information associated with the actionable packet with the information received from the user device 210 (e.g., WFM) by comparing the device identifier information (e.g., device identifier 108) from the actionable packet with the device identifier information received from the WFM based on the request for the wireless communication service. The request can be reconciled if the device identifier received in the request match a device identifier from the actionable packet. If the information is reconciled, then the request for the wireless communication service can be validated by the policy device 208. If the request is validated, then the policy device 208 can provide the user device 210 the connection profile (e.g., communication profile, wide-area network profile, service profile, network profile, etc.).

After receiving the connection profile, as a further security component of the wireless communication network 212, the user device 210 can send an authentication request to the authentication device 204. The authentication request can comprise information from the connection profile. For example, the authentication request can comprise the device identifier and username associated with the connection profile. The authentication device 204 can determine that the user device 210 is associated with the wireless communication service based on the device identifier and username associated with the connection profile. After the authentication device 204 determines that the user device 210 is associated with the wireless communication service, the authentication device 204 can determine a type of authentication for authenticating the user device 210.

The authentication device 204 can determine the type of authentication for authenticating the user device 210 by determining an authentication identifier associated with the connection profile. The type of authentication can be associated with the wireless communication service. The authentication device 204 can perform a predefined function (e.g., a hash function) on the username received in the authentication request and compare a result of performing the predefined function on the username to the generated password associated with the user device 210. If the result and the password match, the user device can be allowed to access the wireless communication service supported by the wireless communication network 212. If the result and the username do not match, the user device 210 can be denied access.

Figure 2B:
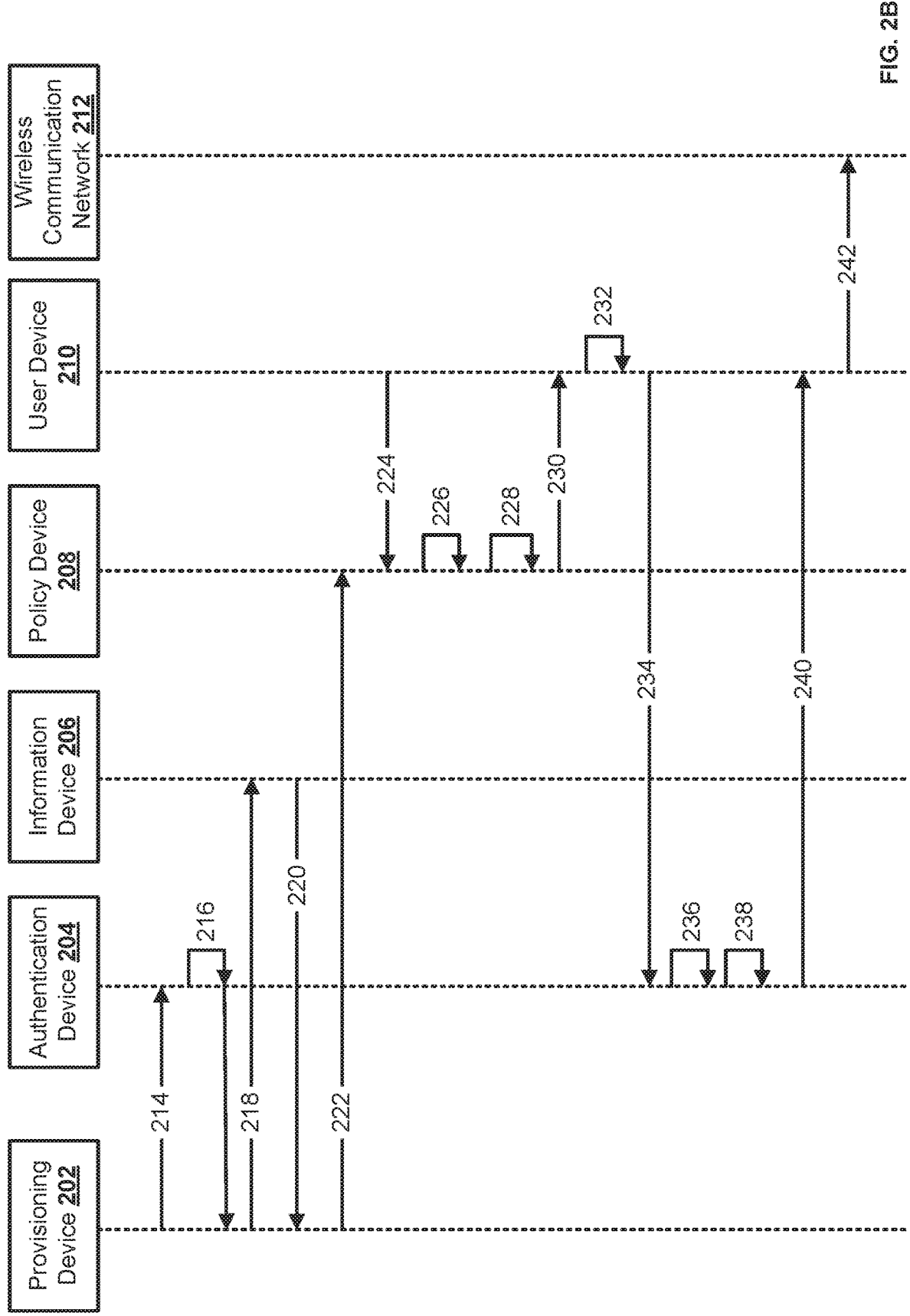
FIG. 2B is a block diagram of an example sequence.

FIG. 2B is a block diagram of an example sequence for providing a wireless communication service (e.g., mobile voice communication service, mobile telephony service, Wi-Fi data service, cellular data service, etc.). The sequence can be implemented by one or more of a plurality of devices, such as the provisioning device 202, the authentication device 204, the information device 206, the policy device 208, and the user device 210, associated with the wireless communication network 212 and/or access point (e.g., gateway device 213). One or more of a plurality of devices, such as the provisioning device 202, the authentication device 204, the information device 206, and the policy device 208 can be a part of/associated with a single device (e.g., the computing device 104, the network device 116, etc.). Additionally, the one or more of the plurality of devices (e.g., the provisioning device 202, the authentication device 204, the information device 206, the policy device 208, and the user device 210) can be standalone devices associated with and/or in communication with a network (e.g., the communication network 212, network 105).

At step 214, provisioning information can be transmitted from the provisioning device 202 to the authentication device 204. For example, when a user purchases a user device 210 (e.g., the user device 102, a mobile device, a tablet device, a laptop, a smart device, etc.), provisioning information can be transmitted from the provisioning device 202 to the authentication device 204 to enable provisioning of and/or access to a wireless communication service. The provisioning information can be related to the user device 210. The provision information can comprise a device identifier, a device identifier, and/or a network address.

The device identifier information can comprise an identifier permanently stored on the user device 210. The device identifier information can comprise a unique number for a service (e.g., wireless network service, such as universal mobile telecommunications system (UMTS) and/or Global System for Mobile Communications (GSM)). The device identifier information can comprise an international mobile subscriber identifier (IMSI) and an international mobile equipment identifier (IMEI). For example, the device identifier can be stored on a removable storage card (e.g., a subscriber identification module (SIM) card) coupled to the user device 210. The network address can comprise a MAC address for a wireless interface of the user device 210. The provisioning information can be determined (e.g., received from the user device 210) in response to registering the user device 210 for a wireless communication service (e.g., mobile voice communication service, mobile telephony service, Wi-Fi data service, cellular data service, etc.).

The provisioning information can comprise one or more user account identifiers. The user account identifier can comprise an identifier assigned (e.g., by a service provider) to the user. The user account identifier can be a unique identifier for the user. The user account identifier can be used to associate the user with one or more services provided by the service provider. The user account identifier can be used to access the one or more services.

At step 216, the authentication device 204 can generate user credentials. The user credentials can comprise a generated username and/or a generated password. For example, the provisioning device 202 (e.g., or any other device, such as the policy device 208) can generate the username based on the device identifier. For example, a username can be generated by applying a predefined function to at least a portion of the device identifier information (e.g., the IMSI). The predefined function can comprise a one-way hash function. The provisioning device 202 (e.g., or any other device, such as the policy device 208) can generate the password. Additionally, the password can be generated based on the device identifier information, the username, and/or the like. The password can be generated by inputting at least a portion of the device identifier information (e.g., IMSI) into a predefined function. The predefined function can comprise a one-way hash function. For example, the generated password can be generated by inputting the IMSI, the IMEI, the MAC address, and/or other identifier into the predefined function. The one-way hash function may be seeded by manually provided data (e.g., user provided credentials) such as a pre-shared secret. Additionally, the one-way hash function may be seeded by dynamic data (e.g., dynamic credentials) such as such as time, an IP address, connection details, and the like, for example. Hash function types can include MD5 and SHA-1, for example.

The authentication device 204 may generate/replicate user data. The authentication device 204 can store one or more or user provided credentials, generated user credentials, and a combination thereof in a database (e.g., database 114). Additionally, the authentication device 204 can provide one or more or user provided credentials, generated user credentials, and a combination thereof to the provisioning device 202.

At step 218, the provisioning device 202 can request network information associated with the user device 210, a user account (e.g., associated with the user device 210), and/or a user (e.g., associated with the user device 210). The provisioning device 202 can request the network information from the information device 206. The information device 206 can determine the network information by searching (e.g., a database) using the device identifier information (e.g., IMSI, IMEI), the user account identifier (e.g., for a user account with a service provider), other device identifiers (e.g., a MAC address) and/or other information related to the user.

The network information can comprise first connection information for a first service, such as a first wireless communication service (e.g., first mobile voice communication service, first mobile telephony service, first Wi-Fi data service, first cellular data service, etc.). The first wireless communication service can comprise a public wireless hotspot, a wireless network managed by a service provider (e.g., wide area wireless network), and/or a wireless communication network accessible using user credentials. For example, a plurality of access points (e.g., the gateway device 213, the network device 116) can be located across a geographic area (e.g., building, region, state, country). One or more (or each) of the plurality of access points can be configured to provide access to the first wireless communication service (e.g., based on the first service identifier). One or more (or each) of the plurality access points can be configured to transmit (e.g., broadcast) and/or receive the first service identifier (e.g., as part of providing access to the first wireless communication service, as part of advertising the first wireless communication service, as part of authenticating for the first wireless communication service, combinations thereof, and of the like. The first connection information can comprise additional information associated with (e.g., stored with, associated via a data structure such as a database) the first service identifier. The additional information can comprise encryption keys, encryption type, certificates, service provider information, service information, service set identifier (SSID) information, combinations thereof, and the like. The network information can comprise second connection information for a second wireless communication service (e.g., second mobile voice communication service, second mobile telephony service, second Wi-Fi data service, second cellular data service, etc.). The second wireless communication service can be managed by one or more service providers associated with the user device 210. The second connection information can comprise a second service identifier (e.g., wireless service set identifier) of the second wireless communication service. For example, the one or more service providers can provide the second service identifier (e.g., SSID). The access point can transmit the second service identifier to the information device 206. As another example, a user can provide (e.g., via an application, via web page) the second service identifier to a remote device, such as the information device 206. If the remote device is different than the information device 206, the information device 206 can receive the second service identifier from the remote device.

At step 220, the information device 206 can transmit a response to the provisioning device 202. The response can comprise the requested network information. For example, the response can comprise (e.g., or be provided with) the first connection information, the second connection information, and/or any other information for additional networks and/or services associated with the user, the device identifier information, and/or the like. The provisioning device 202 can combine the user credentials (e.g., user provided credentials, generated user credentials) with the network information to form a profile (e.g., user profile, service account, etc.) associated with the user device 210.

At step 222, the provisioning device 202 can transmit the profile (e.g., user profile, service account, etc.) and/or information associated with the profile (e.g., profile information) to the policy device 208. For example, the profile information can comprise the device identifier information (e.g., the IMSI, the IMEI), the device identifier (e.g., the IMEI), the generated credentials (e.g., the username comprising the IMSI, the password comprising the result of applying the predefined function to the IMSI), connection information (e.g., the first connection information, the second connection information, the first service set identifier, the second service set identifier, the first the user credentials, the second user credentials, the additional information), encryption passphrases, a combination thereof, and/or the like. The policy device 202 can retain the profile/profile information to respond to requests from the user device 210.

At step 224, the user device 210 can transmit a request to the policy device 208. The request can be transmitted in response to booting (e.g., loading, starting, turning on) the user device 210 (e.g., for the first time). Additionally, the request can be transmitted in response to the user device 210 changing network configurations such as switching out of airplane mode, turning on/off a wireless interface, and the like, for example. The user device 210 can comprise a wireless connection manager configured to manage communications with one or more wireless communication services and/or wireless networks. The request can be transmitted from the user device 210 by the wireless connection manager. The request can comprise a request for one or more connection profiles (e.g., communication profiles, wide-area network profiles, service profiles, network profiles, etc.). The request can comprise the device identifier information (e.g., IMSI, IMEI, etc.).

At step 226, the policy device 208 can validate the request. The request can be validated by comparing at least a portion of the device identifier information to stored device identifier information and/or stored device identifiers. The request can be validated if the device identifier information received in the request matches stored device identifier information.

At step 228, if the request is validated, one or more connection profiles can be generated (e.g., in response to the validation). The policy device 208 can determine connection profile information by matching at least a portion of the device identifier information with information stored in a profile (e.g., user profile, service account, etc.). A first connection profile can be generated (e.g., by the policy device 208). In some cases, the first connection profile can be generated before the request from the user device 210. For example, the provisioning device 202 can generate the first connection profile and transmit the first connection profile to the policy device 208. The first connection profile can comprise at least a portion of the profile information (e.g., that matches the device identifier information). The first connection profile can comprise an association of the first service identifier with the generated user credentials. In the first connection profile, the generated user credentials can be associated with the first service identifier. The first user credentials received from the information device 206 can be replaced with the generated user credentials.

The first connection profile can comprise an authentication identifier. The authentication indicator can indicate a type of authentication. The type of authentication can be associated with a service, such as a wireless communication service (e.g., mobile voice communication service, mobile telephony service, Wi-Fi data service, cellular data service, etc.). The type of authentication can be associated with one or more conventions defining how the username and/or password are determined, generated, authenticated, and/or the like. The authentication identifier can indicate that the username is associated with (e.g., based on, related to) a wireless communication service (e.g., mobile voice communication service, mobile telephony service, Wi-Fi data service, cellular data service, etc.).

A second connection profile (e.g., communication profile, wide-area network profile, service profile, network profile, etc.) can generated (e.g., by the policy device 208). The second connection profile can comprise an association of the second service identifier with the second user credentials. In some implementations, the first connection profile can be combined with the second connection profile as a single connection profile.

At 230, the one or more connection profiles (e.g., the first connection profile, the second connection profile) can be transmitted to the user device 210. The one or more connection profiles can be transmitted to the user device 210 in response to the request from the user device 210. The one or more connection profiles can be transmitted from the policy device 208 to the user device 210. Alternatively, the one or more connection profiles can be transmitted from the policy device 208 to the user device 210, via an intermediate device such as an access point/gateway device (e.g., gateway device 213, network device 116).

At step 232, the user device 210 can apply the one or more connection profiles. For example, the user device 210 can store data in the connection profiles for connecting to one or more wireless communication services.

At step 234, the user device 210 can transmit an authentication request to the authentication device 204. The authentication request can be generated based on a connection profile, such as the first connection profile, the second connection profile, and/or the like. The authentication request can comprise a username (e.g., in a username field). The authentication request comprise a password (e.g., in password field). The username and/or password can comprise values from the connection profile. For example, the username can comprise at least a portion of the device identifier information. The password can comprise the result of inputting at least a portion of the device identifier information (e.g., the IMSI) into the predefined function. For example, the result can comprise a hash of the IMSI. The authentication request can comprise the authentication identifier.

The authentication request can comprise an inner portion and an outer portion. The inner portion can be after (e.g., in data sequence order) the outer portion. The inner portion can comprise the username and/or password. The outer portion can comprise the authentication identifier. The inner portion can comprise an inner identifier (e.g., inner identity) of an extensible authentication protocol (EAP) message, such as an EAP Tunneled Transport Layer Security (TTLS) message, an EAP TTLS password authentication protocol (PAP) message, an EAP transport layer security message, an EAP-TTLS with generic token card (GTC), other versions of EAP transport layer security, and/or any authentication protocol that utilizes a username and password. The outer portion can comprise an outer identifier (e.g., outer identity) of the EAP message.

At step 236, the authentication device 204 can determine a type of authentication. The type of authentication can be determined based the authentication identifier. For example, an authentication identifier that comprises "/modesto" can indicate a type of authentication associated with a Modesto wireless communication service (e.g., mobile voice communication service, mobile telephony service, Wi-Fi data service, cellular data service, etc.). The type of authentication can comprise a default authentication. The type of authentication can be related the wireless communication service. The authentication can comprise a procedure for authenticating a generated username and/or a generated password. The dynamic authentication can be only for devices authorized to use a particular service, such as the wireless communication service.

At step 238, the authentication device 204 can authorize the request by authenticating data associated with the request. The request can be authenticated according to the type of authentication determined in step 236. For example, if the type of authentication comprises the default authentication, then the username and password in the authentication request can be compared to a corresponding stored username and stored password (e.g., received from a user, generated by a user, selected by a user). If the type of authentication comprises the dynamic authentication, then the username received in the request can be input into the predefined function to obtain a result. The result can be compared to the password. If the result matches, the password, then the request can be successfully authenticated. If the result does not match the password, then the authentication of the user device 210 fails.

At step 240, if the request is successfully authenticated, the authentication device 204 can transmit authorization information to the user device 210 that enables the user device 210 to use one or more of the first connection profile and the second connection profile to access the wireless communication service supported by the wireless communication network 212. If, at step 240, the request is not authenticated, the authentication device 204 can transmit a message indicating the user device 210 is not authorized to access the wireless communication network 210 and the process will terminate.

At step 242, after the request is successfully authenticated and the authorization information is received from the authentication device 204, the user device 210 can use one or more of the first connection profile, and the second connection profile, to access a network 212 (e.g., wireless communication network, wireless communication network, network 105). The user device 210 can access the network 212 via the access point (e.g., the gateway device 213, the network device 116). The network 210 can comprise a data network, a wide area network, a local area network, the Internet, a cellular network and/or the like, and support services such as mobile voice communication service, mobile telephony service, Wi-Fi data service, cellular data service, combinations thereof, and the like.

FIG. 3 is a block diagram of an example connection profile 300 (e.g., communication profile, wide-area network profile, service profile, network profile, etc.). The connection profile 300 can be generated by a device (e.g., provisioning device 202, policy device 208, and computing device 104) before or after a request from a user device (e.g., user device 102, user device 210) for wireless communication service. The connection profile 300 can comprise a field 301 for populating a name of the connection profile. The name (301) can identify a particular entity associated with the connection profile 300. For example the name of the connection profile 300 can be populated as "Company XXX Provisioning Profile" in the field 301. The field 301 can be used to identify and/or reference the connection profile 300. Additional information can be used to identify and/or reference the connection profile 300. The connection profile 300 can comprise field 302 for populating a serial number to identify/distinguish the connection profile 300 from other connection profiles. The connection profile 300 can comprise fields that indicate the date the profile was created (303) and issued (304) (e.g., created and/or issued by the policy device 208). For example, the connection profile 300 was created and issued on May 27, 2017 (e.g., 20170527).

Connection profiles may be secured (e.g., requiring authentication and authorization via a secure identifier, such as a SSID, to access a network) or unsecured (e.g., where authentication and authorization is minimal or non-existent and the connection profile may enable an unsecured connection to a network (e.g., the data network 212). As such, the "type" of connection profile can be populated in the field 305. For example, the connection "type" (305) for the connection profile 300 is secure. As an additional security provision, the connection profile 300 can comprise a field 306 to indicate a service set identifier (SSID) to be used for a secure connection. The SSID is the primary name associated with a wireless communication network such as private networks and public hotspots.

A user device (e.g., user device 102, user device 210) can use the SSID to identify and join wireless communication networks (e.g., network 105, data network 212). For example, the SSID for the connection profile 300 is populated at field 306 as "ABC123-Secure." The SSID can be manually configured or automatically configured (e.g., generated) based on associated network (e.g., access point, connection type, service type, etc.) and/or device information such as a device identifier (e.g., device identifier 108, identifier 118), a device identifier, a network address (e.g., interface address, MAC address, MAC address for a wireless interface), etc. Additionally, the connection profile 300 can comprise a field 308 to indicate whether a basic service set identifier (BSSID) is to be associated with a connection created based on the connection profile 300. For example, the connection profile 300 can be associated with "ANY" BSSID.

The connection profile 300 can comprise fields that further define how a wireless connection and/or wireless communication (e.g., wireless communication service) is established and/or maintained. For example, the connection profile 300 can comprise a field that indicates a type (e.g., public or private) of Wi-Fi access point (e.g., gateway device 213, network device 118). For example, it can be indicated at field 309 that the connection profile 300 is associated with a public wireless access point. The wireless access point can be joined either manually or automatically by a device (e.g., user device 102, user device 210) associated with the connection profile 300. Additionally, whether a user device associated with the connection profile 300 is to automatically join an access point can be indicated by field 310. For example, the field 310 can be populated with "true" or "false", such that "true" indicates that a device associated with the connection profile 300 will automatically attempt to join a wireless access point whenever a wireless transceiver associated with the user device is within range of the wireless access point (e.g., gateway device 213, network device 118, wireless hotspot), and "false" indicates that a user device (e.g., user device 102, user device 210) associated with the connection profile 300 will not automatically attempt to join the wireless access point whenever the wireless transceiver associated with the user device is within range of the wireless access point (e.g., wireless hotspot).

As a further security provision, the connection profile 300 can comprise a field 311 that indicates a type of encryption associated with a connection to a network. The connection can be secured by different protection mechanisms such an encryption key and/or an encryption passphrase. The protection mechanisms can be Wired Equivalent Privacy (WEP), Wi-Fi Protected Access (WPA), Wi-Fi Protected Access II (WPA2), or the like. For example, the field 311 indicates that WPA2-Enterprise is to be used to encrypt a connection created based on the connection profile 300.

Additionally, an authentication framework to be used for a connection can be indicated by a field of the connection profile 300. An outer authentication type to be used on the connection can be indicated by field 312. For example, versions of an Extensible Authentication Protocol (EAP), such as EAP Tunneled Transport Layer Security (EAP-TTLS), to be used in the authentication framework can be populated in the field 312. An inner authentication type to be used on the connection can be indicated by the field 313. For example, a password-based authentication protocol, such as Password Authentication Protocol (PAP), to be used in the authentication framework can be populated in the field 312. Other authentication schemes/protocols associated with the connection profile 300 can include Challenge-Handshake Authentication Protocol (CHAP), Authentication and Key Agreement (AKA), Cellular Authentication and Voice Encryption (CAVE) based authentication, Challenge-Response Authentication Mechanism (CRAM), Digest, Host Identity Protocol (HIP), LAN Manager, NT LAN Manager, OpenID protocol, Password-authenticated key agreement protocols, Protocol for Carrying Authentication for Network Access (PANA), Secure Remote Password protocol (SRP), RFID-Authentication Protocols, Woo Lam 92, and the like.

The connection profile 300 can indicate devices (e.g., provisioning device 202, computing device 104, servers, etc.) to which a user device (e.g., user device 102, user device 210) can safely connect to provision a connection via the connection profile 300 in the field 314. For example the connection profile 300 indicates that a user device can connect to "secure.server.1.company.com" and "secure.server.2.company.com" to provision a connection via the connection profile 300.

The connection profile 300 can indicate in field 315 one or more credentials that must be verified/authenticated (e.g., via the authentication device 202) before a connection can be established based on the connection profile 300. For example, as shown in field 315, the one or more credentials can comprise an identifier (e.g., "outer-id", an outer identity used for outer authentication), a username (e.g., "username", a username set for authentication), a password (e.g., "password", a password generated by function and used for authentication), and a security element (e.g., "security", the function type used by the provisioning device 202 to generate a password).

FIG. 4 is a block diagram of an example authentication request message 400. The authentication device 202 can receive the authentication request message 400 from a device, such as a user device (e.g., user device 102, user device 210), for example. The authentication request message 400 can comprise an inner authentication request 407 and an outer authentication request 401. As shown, the inner authentication request 407 can be after (e.g., in data sequence order) the outer authentication request 401.

The outer authentication request 401 can comprise a username. The username can be populated in the field 402. For example, the field 402 can be populated with "/acme" which indicates that/acme is the identity used for outer authentication by the authentication device 202. The outer authentication request 401 can comprise a field 403 that can be populated with an internet protocol (IP) address of an associated gateway device (e.g., gateway device 213, network device 116). For example, the associated gateway device for the authentication request 401 is "1.2.3.4" The authentication request 401 can comprise a field 404 that can be populated with a device identifier (e.g., MAC address, device identifier 108) of a connecting device (e.g., user device 102, user device 210). For example, the device identifier (e.g., MAC address) for the connecting device is "aa:bb:cc:11:22:33." The device identifier for the connecting device can also be represented by the field 406. Additionally, the authentication request 401 can comprise a field 405 that can be populated with a device identifier (e.g., MAC address, identifier 118) of the associated gateway device (e.g., gateway device 213, network device 116). For example, the device identifier (e.g., MAC address) for the associated gateway device is "BC-AB-CC-11-11-22:ABC123-Secure."

The inner authentication request 407 can comprise a field 411 that can be populated with an inner identity reference. For example, the field 411 can be populated with "7488920309487948928374" which indicates that 7488920309487948928374 is the inner identity used for inner authentication as provisioned by a provisioning device (e.g. the provisioning device 202, computing device 104). The inner authentication request 407 can comprise a field 412 that can be populated with a password generated by the authentication device 202 via a hash function.

The inner authentication request 407 can comprise a field 408 that can be populated with an internet protocol (IP) address of an associated gateway device (e.g., gateway device 213, network device 116). For example, the associated gateway device for the authentication request 401 is "1.2.3.4." The authentication request 401 can comprise a field 409 that can be populated with a device identifier (e.g., MAC address, device identifier 108) of a connecting device (e.g., user device 102, user device 210). For example, the device identifier (e.g., MAC address) for the connecting device is "aa:bb:cc:11:22:33." Additionally, the authentication request 401 can comprise a field 410 that can be populated with a device identifier (e.g., MAC address, identifier 118) of the associated gateway device (e.g., gateway device 213, network device 116). For example, the device identifier (e.g., MAC address) for the associated gateway device is "BC-AB-CC-11-11-22:ABC123-Secure."

FIG. 5 is a flowchart of an example method 500 for providing a wireless communication service. At step 502, a connection profile (e.g., communication profile, wide-area network profile, service profile, network profile, etc.) can be transmitted. The connection profile can be transmitted to a user device. The connection profile can comprise a service identifier (e.g., SSID) for a wireless communication service (e.g., a mobile voice communication service, a mobile telephony service, Wi-Fi data service, cellular data service, etc.) and/or wireless communication network. The connection profile can comprise a username for accessing the wireless communication service. The username can comprise at least a portion of device identifier information associated with the wireless communication service. The device identifier information can comprise an international mobile subscriber identifier (IMSI). Additionally, the device identifier information can comprise an international mobile equipment identifier (IMEI). The device identifier information can be retrieved from, accessed from, stored on, and/or the like a subscriber identification module (SIM) card of the user device. Additionally, the device identifier information can be retrieved from, accessed from, stored in, and the like in a profile (e.g., user profile, service account, etc.). The profile can be retrieved from, accessed from, stored in, and the like a database (e.g., database 114). The connection profile (e.g., communication profile, wide-area network profile, service profile, network profile, etc.) can comprise a password for accessing the wireless communication service. The password can be generated by inputting at least a portion of the device identifier information into a predefined function. For example, the password can be generated by inputting the IMSI into a predefined function. The predefined function can comprise a one way hash function. The connection profile can comprise the authentication identifier and an encryption key.

The method 500 can further comprise receiving, from the user device, a request for the connection profile. The request for the connection profile can comprise an international mobile equipment identifier (IMEI) and an international mobile subscribe identifier (IMSI). The request for the connection profile can be validated based on the IMEI and the IMSI. The connection profile can be transmitted in response to validating the request based on the IMEI and IMSI.

At step 504, a request to access the wireless communication service can be received. The request can comprise the username, the password, an authentication identifier, and/or the like. The request can comprise an extensible authentication protocol tunneled transport layer security request. The request can comprise an inner portion (e.g., inner identifier, inner identity) and an outer portion (e.g., outer identifier, outer identity). The inner portion can comprise the username. The outer portion can comprise the authentication identifier.

At step 506, a type of authentication can be determined based on the authentication identifier. The authentication identifier can be used to determine services available to the user device when the user device is in communication with the wireless communication service. For example, the authentication identifier can specify that the user device can only have access to certain access points associated with the wireless communication service, and/or the authentication identifier can specify that the user device can only have access to certain services, such as data services, voice services, a combination thereof, and the like when in communication with the wireless communication service.

At step 508, the user device can be authenticated based on the type of authentication. Authenticating the user device based on the type of authentication can comprise inputting the username into the predefined function to obtain a result and comparing the result to the password. Authenticating the user device can be based on a first authentication procedure and/or a second authentication procedure. The first authentication procedure can be based on user provided credentials. For example, user provider credentials such as a username and/or password can be used to authenticate the device. The second authentication procedure can be based on generated credentials (e.g., generated based on the device identifier information).

At step 510, a message indicating the user device is authorized to access the wireless communication service can be transmitted. The message can be transmitted to the user device. The user device can then access the wireless communication service.

Figure 6:
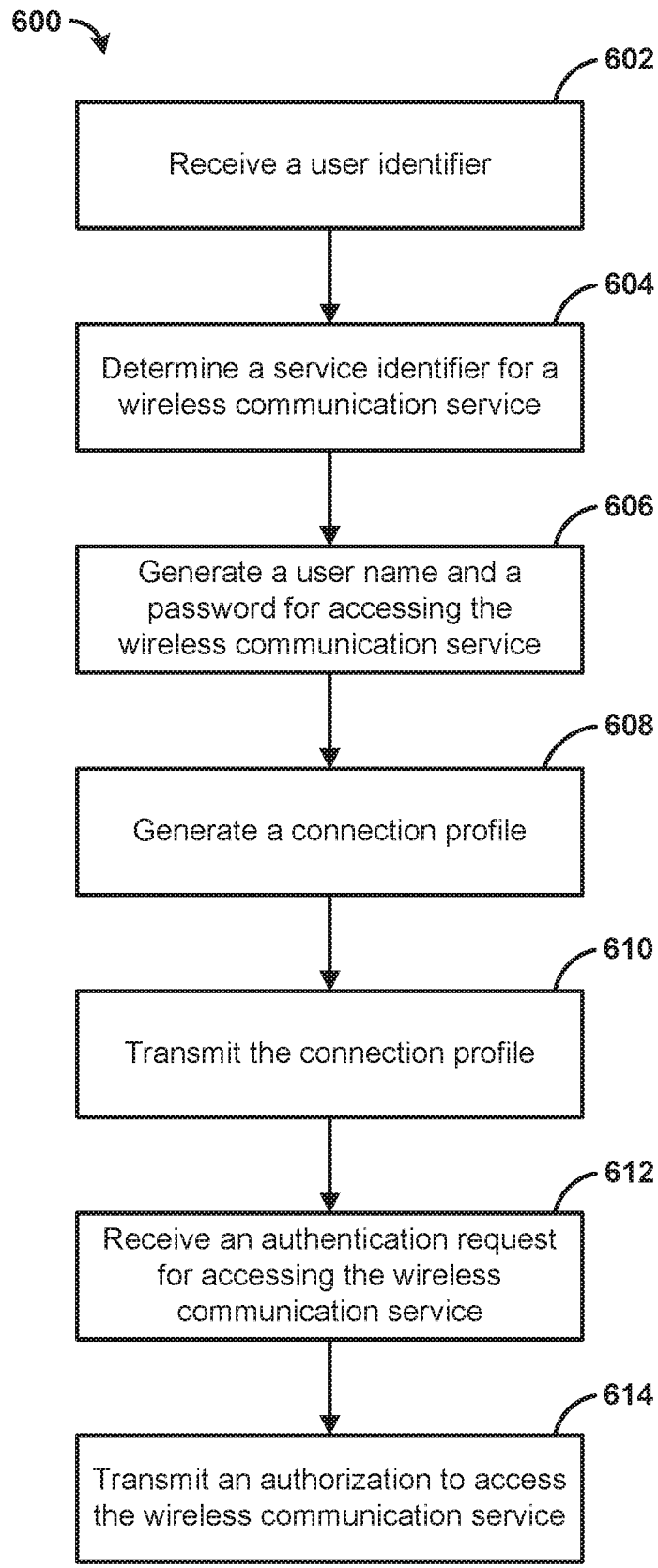
FIG. 6 is a flowchart of an example method.

FIG. 6 is a flowchart of an example method 600 for providing a service. At step 602, device identifier information can be received. The device identifier information can be associated with a wireless communication service (e.g., a mobile voice communication service, a mobile telephony service, Wi-Fi data service, cellular data service, etc.). The device identifier information can be associated with a user device. The device identifier information can comprise an international mobile subscriber identifier (IMSI). Additionally, the device identifier information can comprise an international mobile equipment identifier (IMEI). The device identifier information can be stored on (e.g., determined from, accessed on, retrieved from) a subscriber identification module card of the user device.

At step 604, a service identifier associated with a wireless communication service (e.g., a mobile voice communication service, a mobile telephony service, Wi-Fi data service, cellular data service, etc.) associated with the user device can be determined. The service identifier can be a wireless service set identifier (SSID), for example. The service identifier can be different types of SSIDs such as a basic service set identifier (BSSID), extended service set identifier (ESSID), combinations thereof, and the like.

At step 606, a username and a password for accessing the wireless communication service can be generated. The username can comprise at least a portion of the device identifier information. The password can be generated by inputting at least a portion of the device identifier information into a predefined function. The predefined function can comprise a one way hash function. For example, the password can be generated by inputting an IMSI into a predefined function. The username can be generated by ascribing the IMSI as the username.

At step 608, a connection profile (e.g., communication profile, wide-area network profile, service profile, network profile, etc.) can be generated. The connection profile can comprise an association of the service identifier with the username and the password. Additionally, the connection profile can comprise information, such as information that defines how a connection to and/or communication with the wireless communication service is established and/or maintained, identification information, security information, encryption information, and authentication information, for example.

At step 610, the connection profile can be transmitted. The connection profile can be transmitted to a user device. The connection profile can be transmitted in response to a request from the user device. The request can comprise the device identifier information. For example, the request can comprise the IMSI and the IMEI.

The method 600 can further comprise receiving, from the user device, a request for the connection profile (e.g., communication profile, wide-area network profile, service profile, network profile, etc.). The request can be validated based on the IMEI and the IMSI. The connection profile can be transmitted in response to validating the request based on the IMEI and the IMSI.

At step 612, an authentication request can be received. The authentication request can comprise an authentication request for accessing the wireless communication service via an access point (e.g., gateway device 213, network device 118) associated with the service identifier. The authentication request can comprise the username and the password.

The authentication request can comprise an extensible authentication protocol tunneled transport layer security request. The authentication request can comprise an inner portion (e.g., inner identifier, inner identity) and an outer portion (e.g., outer identifier, outer identity). The inner portion can comprise the username. The outer portion can comprise the authentication identifier.

The method 600 can further comprise authenticating the user device based on a type of authentication indicated by the authentication identifier. The type of authentication can be associated with the mobile voice communication service. The type of authentication can comprise inputting the username into the predefined function to obtain a result and comparing the result to the password. The connection profile (e.g., communication profile, wide-area network profile, service profile, network profile, etc.) can comprise the authentication identifier and an encryption key.

At step 614, an authorization to access the wireless communication service (e.g., a mobile voice communication service, a mobile telephony service, Wi-Fi data service, cellular data service, etc.) can be transmitted. The authorization can be transmitted in response to the authentication request.

Figure 7:
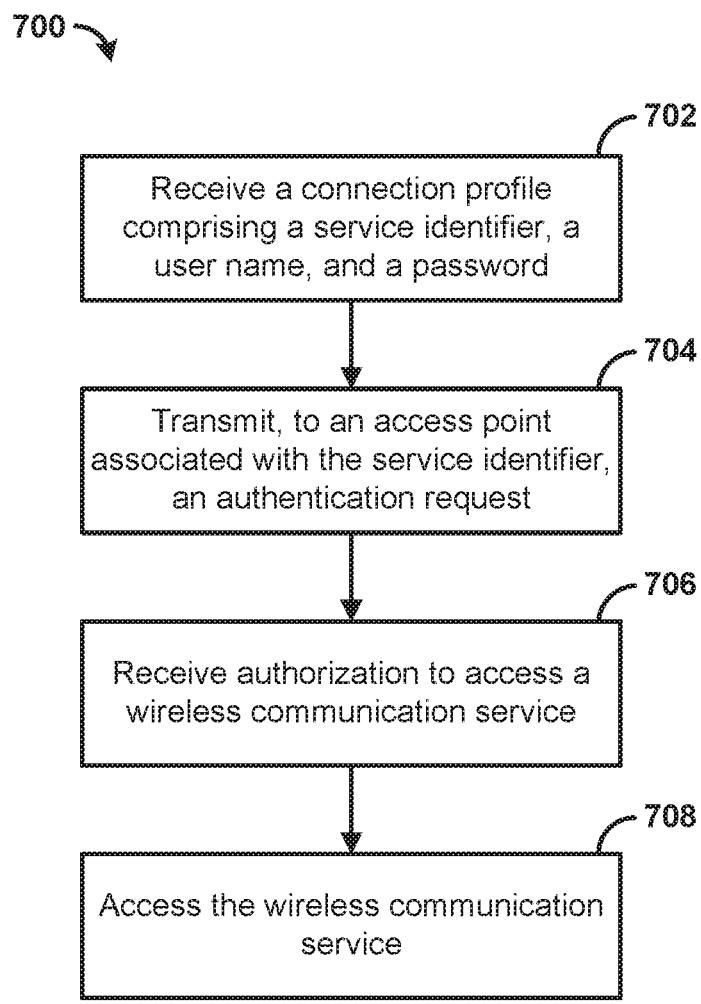
FIG. 7 is a flowchart of an example method.

FIG. 7 is a flowchart of an example method 700 for providing a wireless communication service (e.g., a mobile voice communication service, a mobile telephony service, Wi-Fi data service, cellular data service, etc.). At step 702, a connection profile (e.g., communication profile, wide-area network profile, service profile, network profile, etc.) can be received by a user device. The connection profile can comprise an association of a service identifier of a wireless communication service with a username and a password for accessing the wireless communication service. The device identifier information can comprise an international mobile subscriber identifier (IMSI) and an international mobile equipment identifier (IMEI). All or a portion of the device identifier information can be stored on a subscriber identification module card of a user device. The password can comprise a result of inputting at least a portion of the device identifier information into a predefined function. For example, the password can comprise a result of inputting the IMSI into a predefined function. The connection profile can comprise an authentication identifier and an encryption key.

The method 700 can further comprise transmitting a request for the connection profile. The request for the connection profile can comprise an international mobile equipment identifier (IMEI) and/or an international mobile subscribe identifier (IMSI). A Wi-Fi Connection Manager (WFM) configured on and/or associated with the user device can transmit the IMEI of the user device and/or the device identifier information (e.g., IMSI). The connection profile can be received in response to validation of the request based on the IMEI and the IMSI. Transmitting the request for the connection profile can be performed in response to booting up the user device.

At step 704, an authentication request for accessing the wireless communication service (e.g., a mobile voice communication service, a mobile telephony service, Wi-Fi data service, cellular data service, etc.) can be transmitted. The authentication request can be transmitted to an access point. The access point can be associated with the service identifier. The authentication request can comprise the username, the password, and an authentication identifier indicating a type of authentication associated with the mobile voice communication service.

The authentication request can comprise an extensible authentication protocol tunneled transport layer security request. The authentication request can comprise an inner portion (e.g., inner identifier, inner identity) and an outer portion (e.g., outer identifier, outer identity). The inner portion can comprise the username. The outer portion can comprise the authentication identifier.

At step 706, authorization to access the wireless communication service can be received. For example, the authorization to access the wireless communication service can be received by the user device.

At step 708, the wireless communication service can be accessed. The wireless communication service can be accessed in response to receiving authorization to access the wireless communication service.

Figure 8:
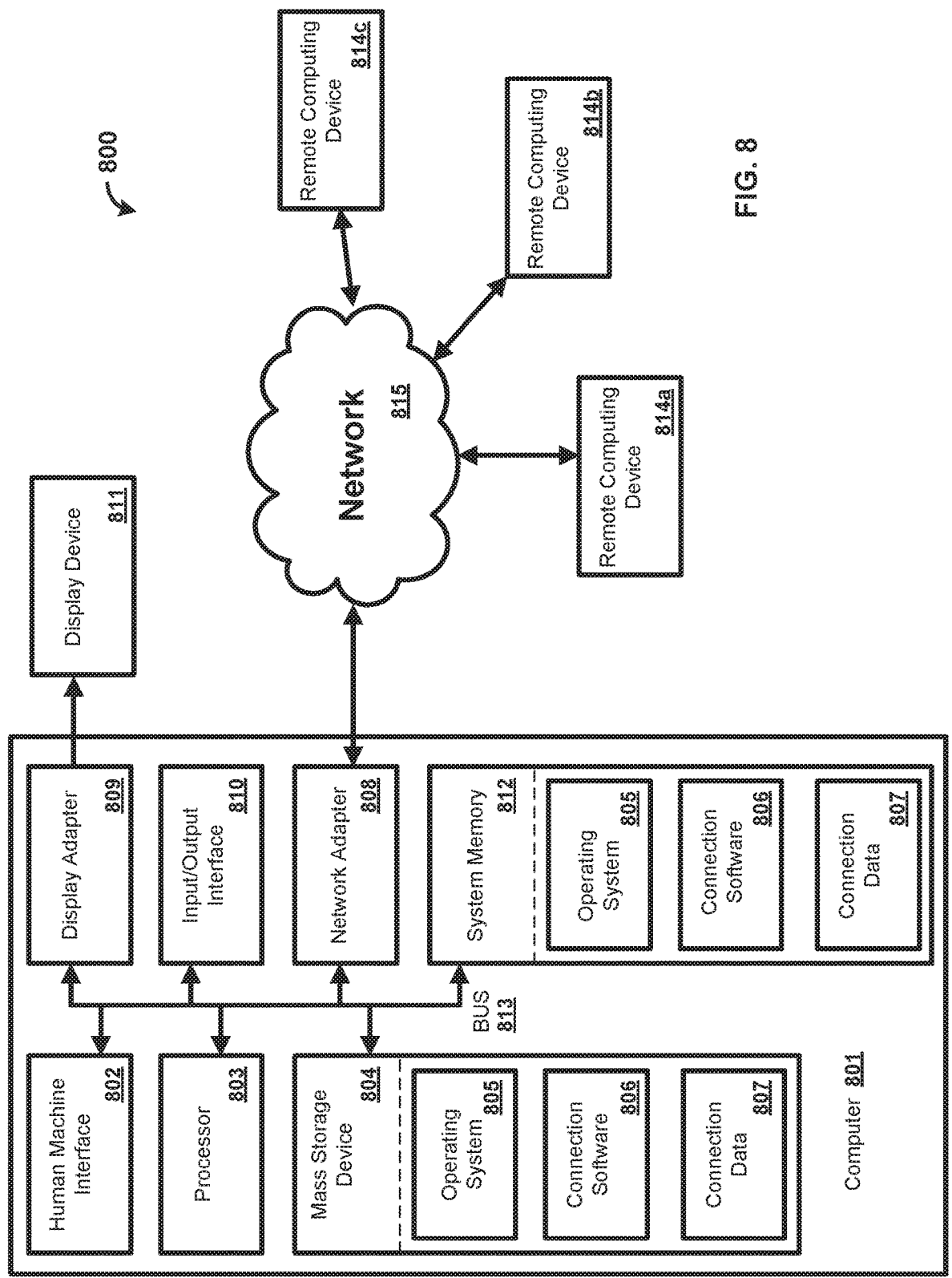
FIG. 8 is a block diagram of an example computing system in which the present methods and systems can operate.

The methods and systems can be implemented on a computer 801 as in FIG. 8 and described below. By way of example, any of the devices of FIG. 1 (e.g., the user device 102, the network device 116, and the computing device 104) and FIG. 2 (e.g., the provisioning device 202, the authentication device 204, the information device 206, the policy device 208, and the user device 210) can be one or more computers as in FIG. 8. Similarly, the methods and systems disclosed can utilize one or more computers to perform one or more functions in one or more locations. FIG. 8 is a block diagram of an example operating environment for performing the disclosed methods. This operating environment is only an example of an operating environment and is not intended to suggest any limitation as to the scope of use or functionality of operating environment architecture. Neither should the operating environment be interpreted as having any dependency or requirement relating to any one or combination of components in the example operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 801. The components of the computer 801 can comprise, but are not limited to, one or more processors 803, a system memory 812, and a system bus 813 that couples various system components including the one or more processors 803 to the system memory 812. The system can utilize parallel computing.

The system bus 813 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 813, and all buses specified in this description can also be implemented over a wired or wireless network connection and each of the subsystems, including the one or more processors 803, a mass storage device 804, an operating system 805, connection software 806, connection data 807, a network adapter 808, the system memory 812, an Input/Output Interface 810, a display adapter 809, a display device 811, and a human machine interface 802, can be contained within one or more remote computing devices 814a,b,c at physically separate locations, connected through buses of this form, in effect implementing a fully distributed system.

The computer 801 typically comprises a variety of computer readable media. Example readable media can be any available media that is accessible by the computer 801 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as the connection data 807 and/or program modules such as the operating system 805 and the connection software 806 that are immediately accessible to and/or are presently operated on by the one or more processors 803.

The computer 801 can also comprise other removable/non-removable, volatile/non-volatile computer storage media. By way of example, FIG. 8 features the mass storage device 804 which can provide non-volatile storage of computer code, computer readable instructions, data structures, program modules, and other data for the computer 801. For example and not meant to be limiting, the mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 804, including by way of example, the operating system 805 and the connection software 806. Each of the operating system 805 and the connection software 806 (or some combination thereof) can comprise elements of the programming and the connection software 806. The connection data 807 can also be stored on the mass storage device 804. The connection data 807 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems.

The user can enter commands and information into the computer 801 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be in communication with the one or more processors 803 via the human machine interface 802 that is coupled to the system bus 813, but can be connected by other interface and bus structures, such as a parallel port, game port, an IEEE 1394 Port (also known as a Firewire port), a serial port, or a universal serial bus (USB).

The display device 811 can also be in communication with the system bus 813 via an interface, such as the display adapter 809. It is contemplated that the computer 801 can have more than one display adapter 809 and the computer 801 can have more than one display device 811. For example, the display device 811 can be a monitor, an LCD (Liquid Crystal Display), or a projector. In addition to the display device 811, other output peripheral devices can comprise components such as speakers (not shown) and a printer (not shown) which can be in communication with the computer 801 via the Input/Output Interface 810. Any step and/or result of the methods can be output in any form to an output device. Such output can be any form of visual representation, including, but not limited to, textual, graphical, animation, audio, tactile, and the like. The display device 811 and computer 801 can be part of one device, or separate devices.

The computer 801 can operate in a networked environment using logical connections to one or more remote computing devices 814*a,b,c*. By way of example, a remote computing device can be a personal computer, portable computer, smartphone, a server, a router, a network computer, a peer device or other common network node, and so on. Logical connections between the computer 801 and a remote computing device 814*a,b,c* can be made via a network 815, such as a local area network (LAN) and/or a general wide area network (WAN). Such network connections can be through the network adapter 808. The network adapter 808 can be implemented in both wired and wireless environments. Such networking environments are conventional and commonplace in dwellings, offices, enterprise-wide computer networks, intranets, and the Internet.

For purposes of example, application programs and other executable program components such as the operating system 805 are shown herein as discrete blocks, although it is recognized that such programs and components reside at various times in different storage components of the computer 801, and are executed by the one or more processors 803 of the computer. An implementation of the connection software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Example computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The following examples are put forth so as to provide those of ordinary skill in the art with a complete disclosure and description of how the compounds, compositions, articles, devices and/or methods claimed herein are made and evaluated, and are intended to be purely example and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be example rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as example only, with a true scope and spirit being indicated by the following claims.

What is claimed is:

1. A method comprising:
   receiving from a user device, a request for a connection profile, wherein the request for the connection profile comprises a device-based identifier of the user device;
   sending, based on validating the device-based identifier, to the user device, the connection profile comprising the device-based identifier in a username field, a password based on the device-based identifier in a password field, and connection information for a wireless communication service;
   receiving a request to access the wireless communication service, wherein the request comprises the device-based identifier from the username field and the password from the password field;
   authenticating, based on determining that a result of inputting the device-based identifier into a predefined function matches the password, the user device; and
   sending, based on authenticating the user device, to the user device, a message indicating the user device is authorized to access the wireless communication service via the connection information in the connection profile.

2. The method of claim 1, wherein the device-based identifier comprises one or more of an international mobile subscriber identifier (IMSI) or an international mobile equipment identifier (IMEI).

3. The method of claim 1, wherein the request to access the wireless communication service further comprises an extensible authentication protocol tunneled transport layer security request having an inner identifier and an outer identifier, wherein the inner identifier comprises the device-based identifier and the outer identifier comprises an authentication identifier.

4. The method of claim 1, further comprising generating, based on inputting the device-based identifier into the predefined function, the password.

5. The method of claim 1,
wherein the device-based identifier comprises one or more of an international mobile equipment identifier (IMEI) or an international mobile subscriber identifier (IMSI),
the method further comprising validating, based on the one or more of the IMEI or the IMSI, the request.

6. The method of claim 1, further comprising:
determining a type of authentication based on an authentication identifier; and
switching, based on the type of authentication, from a first authentication procedure to a second authentication procedure, wherein the first authentication procedure is based on user provided credentials and the second authentication procedure is based on generated credentials, wherein the generated credentials are based on the device-based identifier.

7. The method of claim 1, wherein the connection profile comprises an authentication identifier and an encryption key.

8. The method of claim 1, wherein the connection information comprises one or more of an encryption key, a certificate, a service set identifier (SSID), or combinations thereof.

9. The method of claim 1, wherein the request to access the wireless communication service further comprises an authentication identifier.

10. The method of claim 1, further comprising:
inputting the device-based identifier into the predefined function; and
determining that the result of inputting the device-based identifier into the predefined function matches the password.

11. The method of claim 1, further comprising:
determining, based on an authentication identifier, one or more services that the user device is authorized to access via the wireless communication service.

12. A method comprising:
receiving a device-based identifier associated with a wireless communication service and a user device;
determining, based on the device-based identifier, a service identifier for the wireless communication service;
storing the device-based identifier in a username field and a password based on the device-based identifier in a password field;
generating a connection profile comprising an association of the service identifier with the username field and the password field;
sending, based on a request from the user device, the connection profile;
receiving an authentication request for accessing the wireless communication service via an access point associated with the service identifier, wherein the authentication request comprises the device-based identifier from the username field and the password based on the device-based identifier from the password field; and
sending, based on a result of inputting the device-based identifier into a predefined function matching the password, an authorization to access the wireless communication service via the service identifier.

13. The method of claim 12, wherein the device-based identifier comprises one or more of an international mobile subscriber identifier (IMSI) or an international mobile equipment identifier (IMEI) associated with the user device.

14. The method of claim 12, wherein the authentication request comprises an extensible authentication protocol tunneled transport layer security request having an inner identifier and an outer identifier, wherein the inner identifier comprises the device-based identifier and the outer identifier comprises an authentication identifier.

15. The method of claim 14, further comprising:
authenticating the user device based on a type of authentication indicated by the authentication identifier, wherein the type of authentication is associated with the wireless communication service.

16. The method of claim 14, wherein the connection profile comprises the authentication identifier and an encryption key.

17. The method of claim 12,
wherein the device-based identifier comprises one or more of an international mobile equipment identifier (IMEI) or an international mobile subscriber identifier (IMSI),
the method further comprising validating, based on one or more of the IMEI or the IMSI, the request.

18. The method of claim 12, wherein the predefined function comprises a one way hash function.

19. The method of claim 12, wherein the connection profile comprises one or more of an encryption key, a certificate, a service set identifier (SSID), or combinations thereof.

20. The method of claim 12, wherein the password is based on the result of inputting the device-based identifier into the predefined function.

21. A method comprising:
receiving a connection profile comprising a service identifier of a wireless communication service, a device-based identifier of a user device in a username field and a password based on the device-based identifier in a password field for accessing the wireless communication service;
sending, to an access point associated with the service identifier, an authentication request for accessing the wireless communication service, wherein the authentication request comprises the device-based identifier from the username field and the password from the password field;
receiving authorization to access the wireless communication service; and
accessing the wireless communication service.

22. The method of claim 21, wherein the device-based identifier comprises one or more of an international mobile subscriber identifier (IMSI) or an international mobile equipment identifier (IMEI).

23. The method of claim 21, wherein the connection profile comprises an authentication identifier and an encryption key.

24. The method of claim 21, wherein the authentication request comprises an extensible authentication protocol tunneled transport layer security request having an inner identifier and an outer identifier, wherein the inner identifier comprises the device-based identifier and the outer identifier comprises an authentication identifier.

25. The method of claim 21, further comprising sending a request for the connection profile, wherein the request for the connection profile comprises one or more of an international mobile equipment identifier (IMEI) or an international mobile subscriber identifier (IMSI), wherein the connection profile is received in response to validation of the request based on the one or more of the IMEI or the IMSI.

26. The method of claim 25, wherein sending the request for the connection profile is performed in response to booting up the user device.

27. The method of claim 21, wherein the connection profile comprises one or more of an encryption key, a certificate, a service set identifier (SSID), or combinations thereof.

28. The method of claim 21, wherein the device-based identifier comprises device identifier information associated with the wireless communication service and the password comprises a result of inputting the device-based identifier into a predefined function.

29. The method of claim 21, wherein the authentication request further comprises an authentication identifier indicating a type of authentication associated with the wireless communication service and one or more services that the user device is authorized to access via the wireless communication service.

* * * * *